3,512,737
AIRCRAFT CONTROL SYSTEM INCLUDING MEANS FOR ADJUSTING FLIGHT CONDITION SIGNAL GAIN
Walter A. Platt, Fairlawn, and George H. Pfersch, Jr., Lodi, N.J., and Harry W. Bedell, Jr., Huntington Beach, Calif., assignors to The Bendix Corporation, a corporation of Delaware
Filed July 1, 1968, Ser. No. 741,619
Int. Cl. B64c *13/18*
U.S. Cl. 244—77                            12 Claims

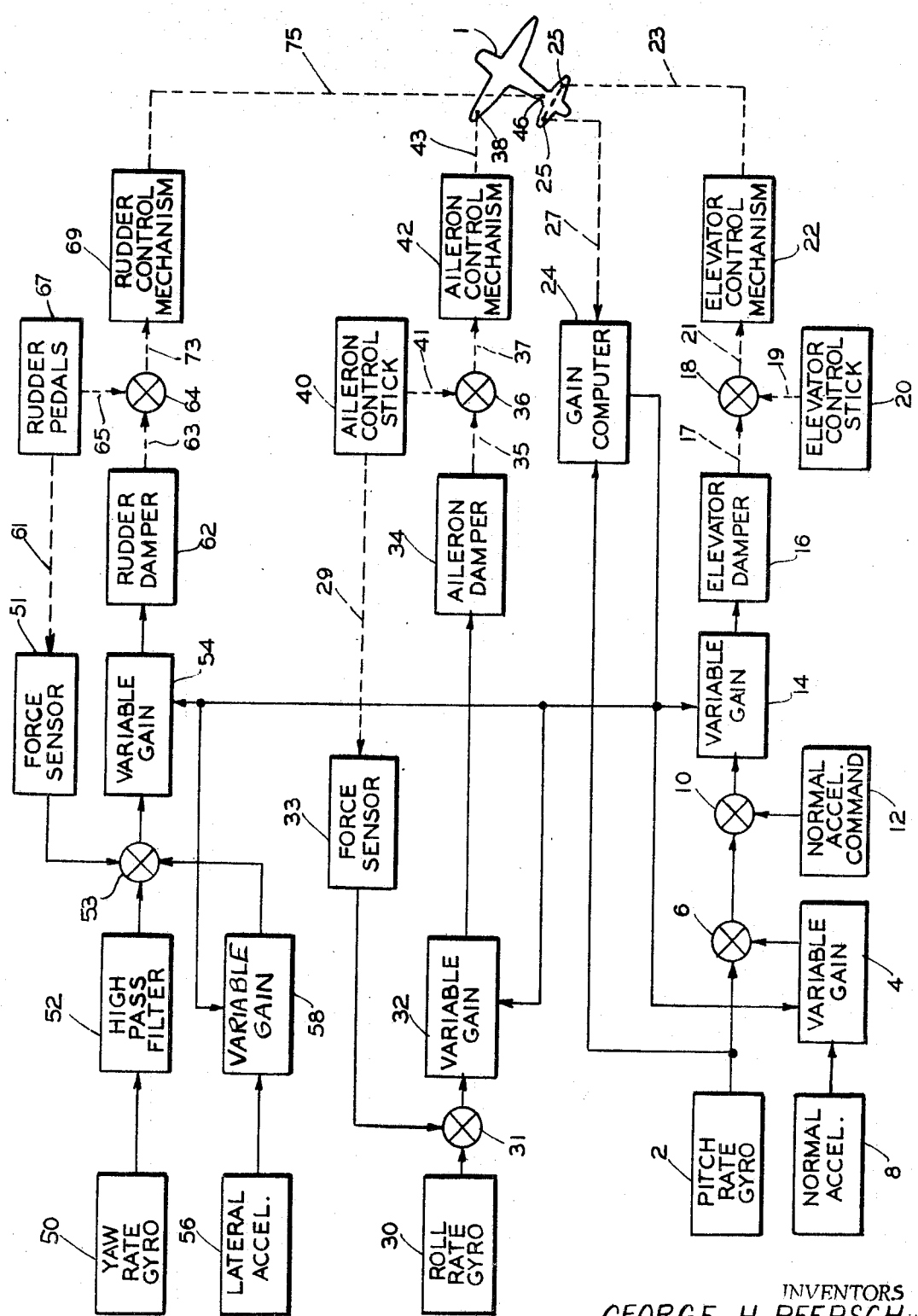

ABSTRACT OF THE DISCLOSURE

A system for controlling an aircraft in response to gain adjusted flight condition signals. The high frequency gain of the aircraft is determined in response to predetermined flight condition signals, and which gain is an approximate measure of the dynamic pressure of the aircraft. Flight condition signal gain is adjusted in direct or inverse proportion to, or as a predetermined function of, the high frequency gain.

CROSS REFERENCE TO RELATED APPLICATIONS

The device of the present invention employs a self-adaptive gain computer such as that disclosed in U.S. Pat. No. 3,361,394 issued to George H. Pfersch on Jan. 2, 1968 and assigned to The Bendix Corporation, assignee of the present invention.

BACKGROUND OF THE INVENTION

Field of the invention

This invention relates to flight control systems and particularly to a system for controlling an aircraft during changing flight conditions. More particularly, the invention relates to means for adjusting the gain of flight condition signals and for controlling the craft in response to the gain adjusted signals.

Description of the prior art

An aircraft is controlled in response to a plurality of gain adjusted flight condition signals. The gain adjustment of the signals must be changed to compensate for changing flight conditions. Heretofore, this has been accomplished by providing a plurality of gain control signals with each of the gain control signals changing the gain adjustment of a corresponding flight condition signal. The present invention provides a single gain control signal corresponding to the dynamic pressure of the aircraft and the gain of all of the flight condition signals is adjusted in response to said gain control signal.

SUMMARY OF THE INVENTION

This invention contemplates an aircraft control system including: means for providing a plurality of flight condition signals; a plurality of variable gain means, with each of the variable gain means being connected to a corresponding flight condition signal means and responsive to the signal therefrom for providing a gain adjusted signal; control means connected to each of the variable gain means for controlling the craft in response to the gain adjusted signals; means responsive to predetermined flight condition signals for providing a gain control signal; and each of the variable gain means being connected to the last mentioned means so that the gain adjustment of the variable gain means is changed in response to the gain control signal.

One object of this invention is to provide a system for controlling an aircraft in response to a plurality of gain adjusted flight condition signals.

Another object of this invention is to include in a system for controlling an aircraft in response to a plurality of gain adjusted flight condition signals, means responsive to predetermined flight condition signals for changing the gain adjustment of all of said signals to compensate for changing flight conditions.

Another object of this invention is to provide a signal corresponding to the dynamic pressure of the aircraft and to adjust flight condition signal gain in response to said signal.

Another object of this invention is to adjust flight condition signal gain directly or inversely proportional to, or as a predetermined function of, the high frequency gain of the craft.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

DESCRIPTION OF THE DRAWING

The single figure in the drawing is a block diagram of an aircraft control system constructed according to the present invention.

DESCRIPTION OF THE INVENTION

A pitch rate gyro 2 provides a signal corresponding to the pitch rate of an aircraft 1 and a normal accelerometer 8 provides a signal corresponding to the normal acceleration of aircraft 1. The pitch rate signal is applied to a summing means 6 and the normal acceleration signal is applied through a variable gain device 4 to summing means 6. Summing means 6 sums the pitch rate signal and the gain adjusted normal acceleration signal and the summation signal is applied to a summing means 10.

A normal acceleration command means 12 provides a normal acceleration command signal which is applied to summing means 10 and summed thereby with the signal from summing means 6. The summation signal from summing means 10 is applied to a variable gain device 14. The signal from variable gain device 14 is applied to an elevator damper 16 which may be a servo providing a displacement corresponding to the signal from variable gain device 14. Elevator damper 16 is connected by suitable mechanical means 17 to a summing means 18.

An elevator control stick 20 located in the cockpit of aircraft 1 and displaced by the human or autopilot to actuate elevators 25 of the craft is connected by suitable mechanical means 19 to summing means 18. Summing means 18 which sums the displacements of elevator damper 16 and control stick 20 and provides a summed displacement is connected by suitable mechanical means 21 to a control mechanism 22. Control mechanism 22 is connected by suitable mechanical means 23 to elevators 25 of the aircraft 1 for actuating elevators 25 to control aircraft 1 about the pitch axis.

The pitch rate signal from pitch rate gyro 2 is applied to a gain computer 24. Elevators 25 of aircraft 1 are connected by suitable mechanical means 27 to gain computer 24. Gain computer 24, which may be of the type described in the aforenoted U.S. Pat. 3,361,394, responds to the signal from pitch rate gyro 2 and the displacement of elevators 25 for computing the high frequency gain of aircraft 1, and which high frequency gain is a measure of the dynamic pressure of the craft, and for providing a gain control signal in a manner described in the aforementioned patent. The gain control signal is applied to variable gain devices 4 and 14 for changing the gain adjustment thereof in accordance with a predetermined relationship. Thus, for purposes of illustration, gain devices 4 and 14 may be arranged to respond to the gain control signal from computer 24 so that the gain adjustments thereof are changed in direct proportion to the high frequency gain of aircraft 1.

A roll rate gyro 30 provides a signal corresponding to the roll rate of aircraft 1. A force sensor 33 is connected by suitable mechanical means 29 to the aileron control stick 40 of aircraft 1, and which control stick is mounted in the cockpit of the craft, and provides a signal corresponding to the human or autopilot force exerted to displace control stick 40 for actuating ailerons 38 of aircraft 1. The signals from roll rate gyro 30 and force sensor 33 are applied to a summing means 31 and the summation signal therefrom is applied to a variable gain device 32. The gain adjusted signal from variable gain device 32 is applied to an aileron damper 34 which may be a servo providing a displacement corresponding to the signal from variable gain device 32. Aileron damper 34 is connected by suitable mechanical means 35 to a summing means 36.

Aileron control stick 40 is connected by suitable mechanical means 41 to summing means 36. Summing means 36, which sums the displacements of aileron damper 34 and aileron control stick 40 and provides a summed displacement, is connected by suitable mechanical means 37 to an aileron control mechanism 42. Control mechanism 42 is connected by suitable mechanical means 43 to ailerons 38 of aircraft 1 for actuating the ailerons to control aircraft 1 about the roll axis.

Variable gain device 32 is connected to gain computer 24 and the gain control signal therefrom changes the gain in accordance with a predetermined relationship. Thus, for purposes of illustration, variable gain device 32 may be arranged to respond to the gain control signal from computer 34 so that the gain adjustment thereof is changed in inverse proportion to the high frequency gain of aircraft 1.

A yaw rate gyro 50 provides a signal corresponding to the yaw rate of aircraft 1 and a lateral accelerometer 56 provides a signal corresponding to the lateral acceleration of aircraft 1. The signal from yaw rate gyro 50 is applied through a high pass filter 52 to a summing means 53. The signal from lateral accelerometer 56 is applied through a variable gain device 58 to summing means 53.

A force sensor 51 connected by suitable mechanical means 61 to rudder pedals 67 of aircraft 1, and which rudder pedals are mounted in the cockpit of aircraft 1, provides a signal corresponding to the human or autopilot force exerted to displace said rudder pedals for actuating rudder 46 of aircraft 1. The signal from force sensor 51 is applied to summing means 53 and summed thereby with the signal from high pass filter 52 and the signal from variable gain device 58.

The summation signal from summing means 53 is applied to a variable gain device 54 and the gain adjusted signal therefrom is applied to a rudder damper 62 which may be a servo for providing a displacement corresponding to the gain adjusted signal. Rudder damper 62 is connected by suitable mechanical means 63 to a summing means 64 and rudder pedals 67 are connected by suitable mechanical means 65 to summing means 64. Summing means 64, which sums the displacements of rudder damper 63 and rudder pedals 67 and provides a summed displacement, is connected by suitable mechanical means 73 to a rudder control mechanism 69. Control mechanism 69 is connected by suitable mechanical means 75 to aircraft rudder 46 for actuating rudder 46 to control aircraft 1 about the yaw axis.

Variable gain devices 54 and 58 are connected to gain computer 24 and the gain control signal therefrom changes the respective gains in accordance with predetermined relationships. Thus, for purposes of illustration, gain adjustment devices 54 and 58 may be arranged to respond to the gain control signal from computer 24 so that the gain adjustments thereof are changed as predetermined functions of the high frequency gain of aircraft 1.

It may be seen from the foregoing description of the invention that gain adjustment in accordance therewith is advantageous in that it gives the aircraft control system designer more degrees of freedom with which to force system performance to satisfy handling specifications. Moreover, this is accomplished without the complexities that would arise if, for example, systems employing air data scheduling were used.

Although but a single embodiment of the invention has been illustrated and described in detail, it is to be expressly understood that the invention is not limited thereto. For example, although the high frequency gain of the aircraft is computed in response to pitch condition signals, it could equally as well be computed in response to roll or yaw condition signals. Various changes may also be made in the design and arrangement of the parts without departing from the spirit and scope of the invention as the same will now be understood by those skilled in the art.

What is claimed is:
1. An aircraft control system, comprising:
 means for providing a pitch rate signal;
 means for providing a normal acceleration signal;
 means for providing a normal acceleration command signal;
 means for providing a roll rate signal;
 means for providing a yaw rate signal;
 means for providing a lateral acceleration signal;
 a control element which is displaced for controlling the craft about the pitch axis;
 a control element which is displaced for controlling the craft about the roll axis;
 a control element which is displaced for controlling the craft about the yaw axis;
 means for providing a signal corresponding to the force exerted to displace the roll control element;
 means for providing a signal corresponding to the force exerted to displace the yaw control element; and
 means connected to all of said signal providing means and responsive to the signals therefrom, and connected to the roll, pitch and yaw control elements and responsive to the displacements thereof for displacing roll, pitch and yaw control surfaces to control the craft.

2. An aircraft control system as described by claim 1, including:
 first gain adjusting means connected to the normal acceleration signal means for providing a first gain adjusted signal;
 second gain adjusting means connected to the pitch rate signal means, the first gain adjusting means and the normal acceleration command signal means for providing a second gain adjusted signal;
 means connected to the second gain adjusting means for providing a displacement corresponding to the signal therefrom;
 means connected to the pitch control elements, said displacement means and the pitch control surface for displacing said surface to control the craft about the pitch axis in response to the displacements of the displacement means and the pitch control element;

means connected to one of the roll, pitch and yaw rate signal means and responsive to the signal therefrom, and connected to the corresponding control surface of the roll, pitch and yaw control surfaces and responsive to the displacement thereof, for providing a gain control signal; and the first and second gain adjusting means connected to the last mentioned means so that the gain adjustments thereof are changed in response to the gain control signal.

3. An aircraft control system as described by claim 1, including:

gain adjusting means connected to the roll rate signal means and to the means for providing a signal corresponding to the force exerted to displace the roll control element for providing a gain adjusted signal;

means connected to the gain adjusting means for providing a displacement corresponding to the signal therefrom;

means connected to the roll control element, the roll control surface and said displacement means for displacing said surface to control the craft about the roll axis in response to the displacements of the displacement means and the roll control element;

means connected to one of the roll, pitch and yaw rate signal means and responsive to the signal therefrom and connected to the corresponding control surface of the roll, pitch and yaw control surfaces and responsive to the displacement thereof for providing a gain control signal; and the gain adjusting means connected to the last mentioned means so that the gain adjustment thereof is changed in response to the gain control signal.

4. An aircraft control system as described by claim 1, including:

first gain adjusting means connected to the lateral acceleration signal means for providing a first gain adjusted signal;

second gain adjusting means connected to the yaw rate signal means, the first gain adjusting means and to the means for providing a signal corresponding to the force exerted to displace the yaw control element for providing a second gain adjusted signal;

means connected to the second gain adjusting means for providing a displacement corresponding to the signal therefrom;

means connected to the yaw control means, the yaw control surface and said displacement means for displacing said surface to control the craft about the roll axis in response to the displacements of the displacement means and the yaw control element;

means connected to one of the roll, pitch and yaw rate signal means and responsive to the signal therefrom, and connected to the corresponding control surface of the roll, pitch and yaw control surfaces and responsive to the displacement thereof for providing a gain control signal; and the first and second gain adjusting means connected to the last mentioned means so that the gain adjustments thereof are changed in response to the gain control signal.

5. An aircraft control system as described by claim 1, including:

first gain adjusting means connected to the normal acceleration signal means for providing a first gain adjusted signal;

second gain adjusting means connected to the pitch rate signal means, the first gain adjusting means and the normal acceleration command signal means for providing a second gain adjusted signal;

third gain adjusting means connected to the roll rate signal means and to the means for providing a signal corresponding to the force exerted to displace the roll control element for providing a third gain adjusted signal;

fourth gain adjusting means connected to the lateral acceleration signal means for providing a fourth gain adjusted signal;

fifth gain adjusting means connected to the yaw rate signal means, the fourth gain adjusting means and the means for providing a signal corresponding to the force exerted to displace the yaw control element for providing a fifth gain adjusted signal;

means connected to the second gain adjusting means for displacing the pitch control surface in response to the signal therefrom;

means connected to the third gain adjusting means for displacing the roll control surface in response to the signal therefrom; and means connected to the fifth gain adjusting means for displacing the yaw control surface in response to the signal therefrom.

6. An aircraft control system as described by claim 5, including:

means connected to the pitch rate signal means and responsive to the signal therefrom, and connected to the pitch control surface and responsive to the displacement thereof for providing a gain control signal; and all of the gain adjusting means being connected to the gain control signal means so that the gain adjustments thereof are changed in response to the gain control signal.

7. An aircraft control system as described by claim 2, including:

means connected to the pitch rate signal means and to the first gain adjusting means for combining the signals therefrom;

means connected to said signal combining means and to the normal acceleration command signal means for combining the signals therefrom; and the second gain adjusting means being connected to the last mentioned combining means for providing the second gain adjusted signal.

8. An aircraft control system as described by claim 3, including:

means connected to the roll rate signal means and to the means for providing a signal corresponding to the force exerted to displace the roll control element for combining said signals; and the gain adjusting means being connected to the combining means for providing the gain adjusted signal.

9. An aircraft control system as described by claim 4, including:

means connected to the first gain adjusting means, the yaw rate signal means and the means for providing a signal corresponding to the force exerted to displace the yaw control element for combining the signals therefrom; and the second gain adjusting means being connected to the combining means for providing the second gain adjusting signal.

10. An aircraft control system as described by claim 2, including:

means connected to the pitch control element and to the displacement means for combining the displacements therefrom, and the displacement combining means being connected to the pitch control surface so that said surface is displaced in response to the combined displace-displaced in response to the combined displacement.

11. An aircraft control system as described by claim 3, including:

means connected to the roll control element and to the displacement means for combining the displacements therefrom; and the displacement combining means being connected to the roll control surface so that said surface is displaced in response to the combined displacement.

12. An aircraft control system as described by claim 4, including:
 means connected to the yaw control element and to the displacement means for combining the displacements therefrom; and
 the displacement combining means being connected to the yaw control surface so that surface is displaced in response to the combined displacement.

References Cited

UNITED STATES PATENTS

| 2,832,551 | 4/1958 | Gille | 244—77 |
| 3,033,496 | 5/1962 | Brands | 244—77 |
| 3,236,478 | 2/1966 | Adams et al. | 244—77 X |
| 3,386,689 | 6/1968 | Parker et al. | 244—77 |

FERGUS S. MIDDLETON, Primary Examiner